United States Patent
Fan et al.

(10) Patent No.: US 9,852,148 B2
(45) Date of Patent: *Dec. 26, 2017

(54) FILE PATH MODIFICATION BASED MANAGEMENT

(71) Applicant: International Business Machines Corporation, Armonk, NY (US)

(72) Inventors: Si Bin Fan, Beijing (CN); Ping Xiao, Beijing (CN); XiaoLin Zhang, Beijing (CN); Jia Zou, Beijing (CN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/337,162

(22) Filed: Oct. 28, 2016

(65) Prior Publication Data
US 2017/0039216 A1 Feb. 9, 2017

Related U.S. Application Data

(63) Continuation of application No. 15/142,026, filed on Apr. 29, 2016, now Pat. No. 9,547,658, which is a
(Continued)

(51) Int. Cl.
*G06F 17/30* (2006.01)
*G06F 7/00* (2006.01)

(52) U.S. Cl.
CPC .. *G06F 17/30174* (2013.01); *G06F 17/30115* (2013.01); *G06F 17/30126* (2013.01);
(Continued)

(58) Field of Classification Search
None
See application file for complete search history.

(56) References Cited

U.S. PATENT DOCUMENTS 6,192,375 B1 * 2/2001 Gross ............... G06F 17/30067
6,983,296 B1 1/2006 Muhlestein et al.
(Continued)

FOREIGN PATENT DOCUMENTS

| CN | 101819525 B | 11/2013 |
| EP | 1755250 A1 | 2/2007 |
| JP | 4437116 B2 | 3/2010 |

OTHER PUBLICATIONS

Mell et al., "The NIST Definition of Cloud Computing," National Institute of Standards and Technology, Sep. 2011, p. 1-3, Special Publication 800-145.
(Continued)

*Primary Examiner* — Jeffrey A Burke
(74) *Attorney, Agent, or Firm* — Reza Sarbakhsh

(57) ABSTRACT

A method for synchronizing file paths associated with computer files based on file path modifications is provided. The method may include detecting a file path modification to a referenced file path associated with a computer file. The method may also include identifying a type of the file path modification. The method may further include identifying a generated file path based on the type of the file path modification. Additionally, the method may include synchronizing the referenced file path to the generated file path. The method may also include modifying the file path information associated with the computer file. The method may further include generating association information in a file properties window associated with the referenced file path and the at least one generated file path. The method may also include validating and extracting the file path information associated with the computer file for use by at least one application.

1 Claim, 10 Drawing Sheets

Related U.S. Application Data continuation of application No. 14/723,746, filed on May 28, 2015.

(52) U.S. Cl.
CPC .. *G06F 17/30129* (2013.01); *G06F 17/30144* (2013.01); *G06F 17/30176* (2013.01); *G06F 17/30215* (2013.01)

(56) References Cited

U.S. PATENT DOCUMENTS

| | | | |
|---|---|---|---|
| 7,073,096 B2* | 7/2006 | Pouyollon | G06F 11/362 714/38.14 |
| 7,395,281 B2* | 7/2008 | Edwards | G06F 17/30176 |
| 7,890,551 B2 | 2/2011 | Benelisha et al. | |
| 7,930,272 B2* | 4/2011 | Sagar | G06F 17/30174 707/626 |
| 8,171,062 B2* | 5/2012 | Hachio | G06F 17/30115 707/802 |
| 8,180,867 B2 | 5/2012 | Wan et al. | |
| 8,666,996 B2* | 3/2014 | Kondasani | G06F 17/30887 707/758 |
| 9,535,925 B2* | 1/2017 | Gowda | G06F 17/30079 |
| 9,547,658 B2 | 1/2017 | Fan et al. | |
| 2005/0262102 A1 | 11/2005 | Anderson et al. | |
| 2011/0145216 A1 | 6/2011 | Subramanya | |
| 2012/0150900 A1* | 6/2012 | Aubert | G06F 17/30115 707/769 |
| 2014/0040197 A1 | 2/2014 | Wijayaratne et al. | |
| 2014/0095553 A1 | 4/2014 | Panteleenko et al. | |
| 2014/0157131 A1* | 6/2014 | Mihovilovic | H04L 41/22 715/736 |
| 2014/0181033 A1 | 6/2014 | Pawar et al. | |
| 2014/0188803 A1 | 7/2014 | James et al. | |
| 2014/0237024 A1 | 8/2014 | Chen et al. | |
| 2014/0337482 A1 | 11/2014 | Houston et al. | |
| 2015/0067005 A1* | 3/2015 | Avati | G06F 17/30203 707/827 |
| 2015/0205979 A1* | 7/2015 | Dong | G06F 21/568 726/22 |
| 2015/0356111 A1 | 12/2015 | Kalsi et al. | |
| 2016/0283214 A1 | 9/2016 | Hill et al. | |
| 2016/0350327 A1 | 12/2016 | Fan et al. | |
| 2017/0039220 A1 | 2/2017 | Fan et al. | |

OTHER PUBLICATIONS

Nirsoft, "FolderChangesView v1.68—Monitor files changes on Windows," Copyright 2012-2015 Nir Sofer, p. 1-4, http://www.nirsoft.net/utils/folder_changes_view.html, Accessed on Mar. 6, 2015.

IBM, "List of IBM Patents or Patent Applications Treated as Related (Appendix P)," Feb. 28, 2017, p. 1-2.

* cited by examiner

FILE PATH MODIFICATION BASED MANAGEMENT

BACKGROUND

The present invention relates generally to the field of computing, and more specifically, to file synchronization.

Computer files generally include referenced file paths that indicate where computer files are located. Specifically, the referenced file paths include the names of the computer files and the directories and folders which specify the location of the computer files in a computer file system. Furthermore, computer file systems may typically include a hierarchy of directories and folders that organizes the computer files to simplify storing and retrieving file content. For example, a computer file may have a referenced file path such as, C:\samplepath\abc\user\local\comp.exe, whereby the file name is comp.exe, and the directories and folders that indicate the file location is C:\samplepath\abc\user\local. As such, computer files may be located using the file path information. Furthermore, other applications and programs may refer to the computer file using the file path information.

SUMMARY

A method for synchronizing file paths associated with computer files based on at least one file path modification is provided. The method may include detecting the at least one file path modification to a referenced file path associated with a computer file. The method may also include identifying a type of the at least one file path modification to the referenced file path associated with the computer file. The method may further include identifying at least one generated file path based on the identified type of the at least one file path modification. Additionally, the method may include synchronizing the referenced file path associated with the computer file to the at least one generated file path associated with the computer file. The method may also include modifying a plurality of file path information associated with the computer file based on the synchronized referenced file path and the at least one generated file path associated with the computer file. The method may further include generating a plurality of association information in a file properties window associated with the referenced file path and the at least one generated file path. The method may also include validating and extracting the file path information associated with the computer file for use by at least one application.

A computer system for synchronizing file paths associated with computer files based on at least one file path modification is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include detecting the at least one file path modification to a referenced file path associated with a computer file. The method may also include identifying a type of the at least one file path modification to the referenced file path associated with the computer file. The method may further include identifying at least one generated file path based on the identified type of the at least one file path modification. Additionally, the method may include synchronizing the referenced file path associated with the computer file to the at least one generated file path associated with the computer file. The method may also include modifying a plurality of file path information associated with the computer file based on the synchronized referenced file path and the at least one generated file path associated with the computer file. The method may further include generating a plurality of association information in a file properties window associated with the referenced file path and the at least one generated file path. The method may also include validating and extracting the file path information associated with the computer file for use by at least one application.

A computer program product for synchronizing file paths associated with computer files based on at least one file path modification is provided. The computer program product may include one or more computer-readable storage devices and program instructions stored on at least one of the one or more tangible storage devices, the program instructions executable by a processor. The computer program product may include program instructions to detect the at least one file path modification to a referenced file path associated with a computer file. The computer program product may also include program instructions to identify a type of the at least one file path modification to the referenced file path associated with the computer file. The computer program product may further include program instructions to identify at least one generated file path based on the identified type of the at least one file path modification. Additionally, the computer program product may include program instructions to synchronize the referenced file path associated with the computer file to the at least one generated file path associated with the computer file. The computer program product may also include program instructions to modify a plurality of file path information associated with the computer file based on the synchronized referenced file path and the at least one generated file path associated with the computer file. The computer program product may further include program instructions to generate a plurality of association information in a file properties window associated with the referenced file path and the at least one generated file path. The computer program product may also include program instructions to validate and extract the file path information associated with the computer file for use by at least one application.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
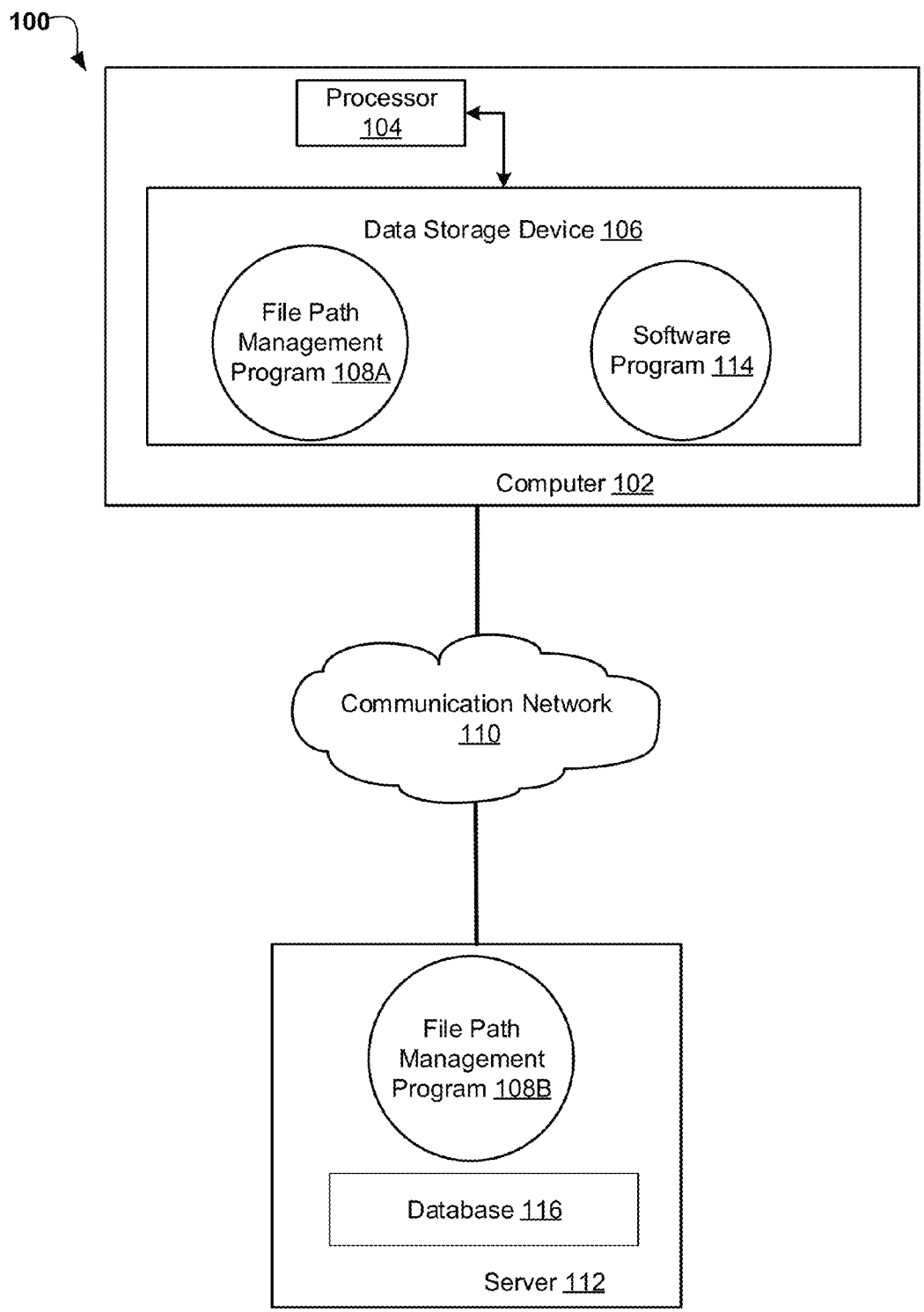
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly, to file path synchronization. The following described exemplary embodiments provide a system, method and program product for detecting file path changes associated with computer files, and synchronizing the file paths to the computer files. Therefore, the present embodiment has the capacity to improve the technical field of computer file path management by synchronizing the referenced file paths and at least one target file path to computer files. Specifically, the present embodiment may maintain the validity of referenced file paths for computer files despite changing the referenced file paths associated with the computer files.

As previously described with respect to file synchronization, computer files typically include referenced file paths to locate the computer files in a file system. Specifically, a computer file may be created, and a file path associated with the computer file may be generated. Therefore, applications and programs running on a computer may reference the computer file using the file path information. For example, as previously described, a computer file may have a file path such as, C:\samplepath\abc\user\local\comp.exe. Thus, a user may locate the computer file using the directories and folders in the file path. However, the file paths associated with the computer files may change due to actions such as renaming the computer files, moving the computer files to other directories and folders, and deleting the computer files. Therefore, based on the change to the computer files, the original referenced file paths for the computer files may be invalid. For example, a computer file may have the file path C:\samplepath\abc\user\local\comp.exe, however, the computer file may be moved from folder "local" to folder "global". Thus, the file path for the computer file may be changed to C:\samplepath\abc\user\global\comp.exe. Therefore, when referencing the computer file using the original reference file path, C:\samplepath\abc\user\local\comp.exe, an error message may appear indicating that the file path is invalid because the file path associated with the computer file has been changed. As such, it may be advantageous, among other things, to provide a system, method and program product for detecting file path changes associated with computer files, and synchronizing the file path to the computer files.

According to at least one embodiment of the present invention, modifications to computer files and the referenced file paths associated with the computer files may be detected. Based on the modifications, at least one target file path associated with the computer file may be generated. Then, according to one implementation, the referenced file path and the at least one target file path associated with the computer file may be synchronized. Alternatively, a user may be enabled to synchronize or not to synchronizing the referenced file paths and the at least one target file path associated with the computer files. Then, based on the synchronization, the file path information associated with the computer file may be modified. Additionally, an association tab may be generated in the file properties folder of the computer file, whereby users may be further enabled to view and edit the file paths associated with the computer files. Thereafter, the file path information associated with the computer file may be validated and extracted for use by applications and programs.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for detecting file path modifications associated with computer files and synchronizing the file paths associated with the computer files based on the modifications.

According to at least one implementation, at least one modification to a computer file and the referenced file path associated with the computer file may be detected. Then, the type of modification applied to the computer file may be identified. Next, based on the identified modification, at least one generated target file path associated with the computer file may be identified. Thereafter, the at least one generated target file path may be synchronized with the referenced file path associated with the computer file. Next, based on the synchronization, the file path information associated with the computer file may be modified. Then, an association tab may be generated in the file properties of the synchronized file paths associated with the computer file. Thereafter, the file path information associated with the computer file may be validated and extracted for use by applications and programs.

Referring now to FIG. 1, an exemplary networked computer environment 100 in accordance with one embodiment is depicted. The networked computer environment 100 may include a computer 102 with a processor 104 and a data storage device 106 that is enabled to run a file path management program 108A and a software program 114. The software program 114 may be an application program such as an internet browser and an email program. The file path management program 108A may communicate with the software program 114. The networked computer environment 100 may also include a server 112 that is enabled to run a file path management program 108B and a communication network 110. The networked computer environment 100 may include a plurality of computers 102 and servers 112, only one of which is shown for illustrative brevity.

According to at least one implementation, the present embodiment may also include a database 116, which may be running on server 112. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 8, server computer 112 may include internal components 8000a and external components 9000a, respectively and client computer 102 may include internal components 8000b and external components 9000b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the file path management program 108A, 108B may interact with a database 116 that may be embedded in various storage devices, such as, but not limited to a mobile device 102, a networked server 112, or a cloud storage service.

According to the present embodiment, a program, such as a file path management program 108A and 108B may run on the client computer 102 or on the server computer 112 via a communications network 110. The file path management program 108A, 108B may synchronize the computer file paths associated with computer files. Specifically, a user using a computer, such as computer 102, may run a file path management program 108A, 108B, that interacts with a database 116, to detect file path changes associated with computer files, synchronize the file path changes with the referenced file paths associated with the computer files, and therefore, maintain valid file paths for the computer files despite the file path changes.

Figure 2:
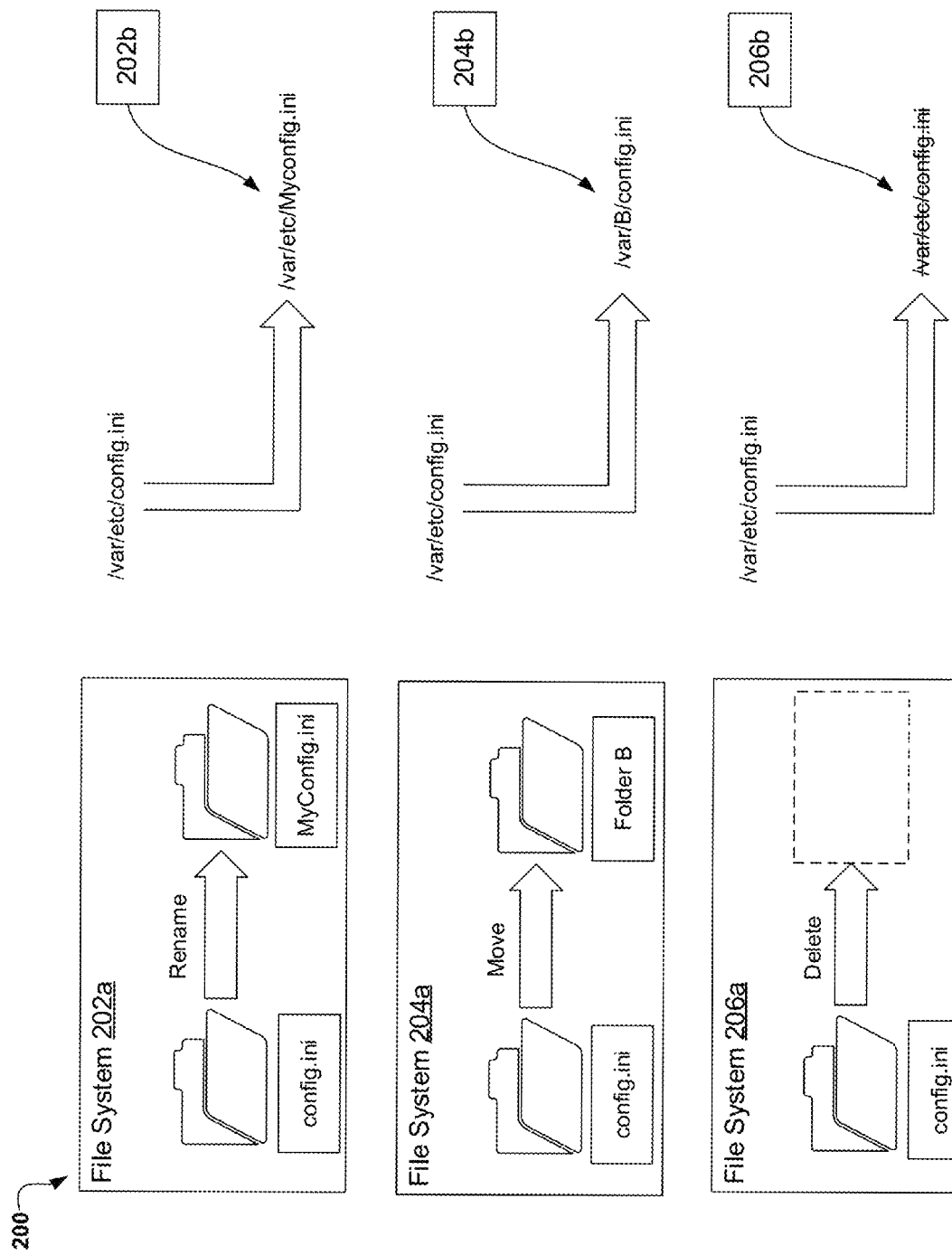
FIG. 2 is a block diagram illustrative of examples of file path changes according to one embodiment.

Referring now to FIG. 2, an example of file path changes 200 in accordance with one embodiment is depicted. As previously described in FIG. 1, the file path management program 108A, 108B (FIG. 1) may detect file path changes made to the referenced file paths associated with computer files. Specifically, the file path management program 108A, 108B (FIG. 1) may detect file paths generated based on file path changes such as renaming the computer files, moving the computer files to at least one folder, and deleting the computer files. For example, file systems 202a, 204a, 206a may include the computer file "config.ini", whereby the file path, /var/etc/config.ini, may be the referenced file path for "config.ini". Therefore, with respect to the file system 202a, the file path management program 108A, 108B (FIG. 1) may detect the renaming of the computer file from "config.ini" to "Myconfig.ini". Thus, in 202b, the file path associated with the computer file may be changed from /var/etc/config.ini to the target file path/var/etc/Myconfig.ini. Furthermore, with respect to the file system 204a, the file path management program 108A, 108B (FIG. 1) may detect moving the computer file from the folder "etc" to the folder "B". Therefore, in 204b, the file path associated with the computer file may be changed from/var/etc/config.ini to the target file path/var/B/config.ini. Additionally, in the file system 206a, the file path management program 108A, 108B (FIG. 1) may detect the deletion of the computer file, whereby the source file path, /var/etc/config.ini, may no longer exist as depicted in 206b.

Figure 3:
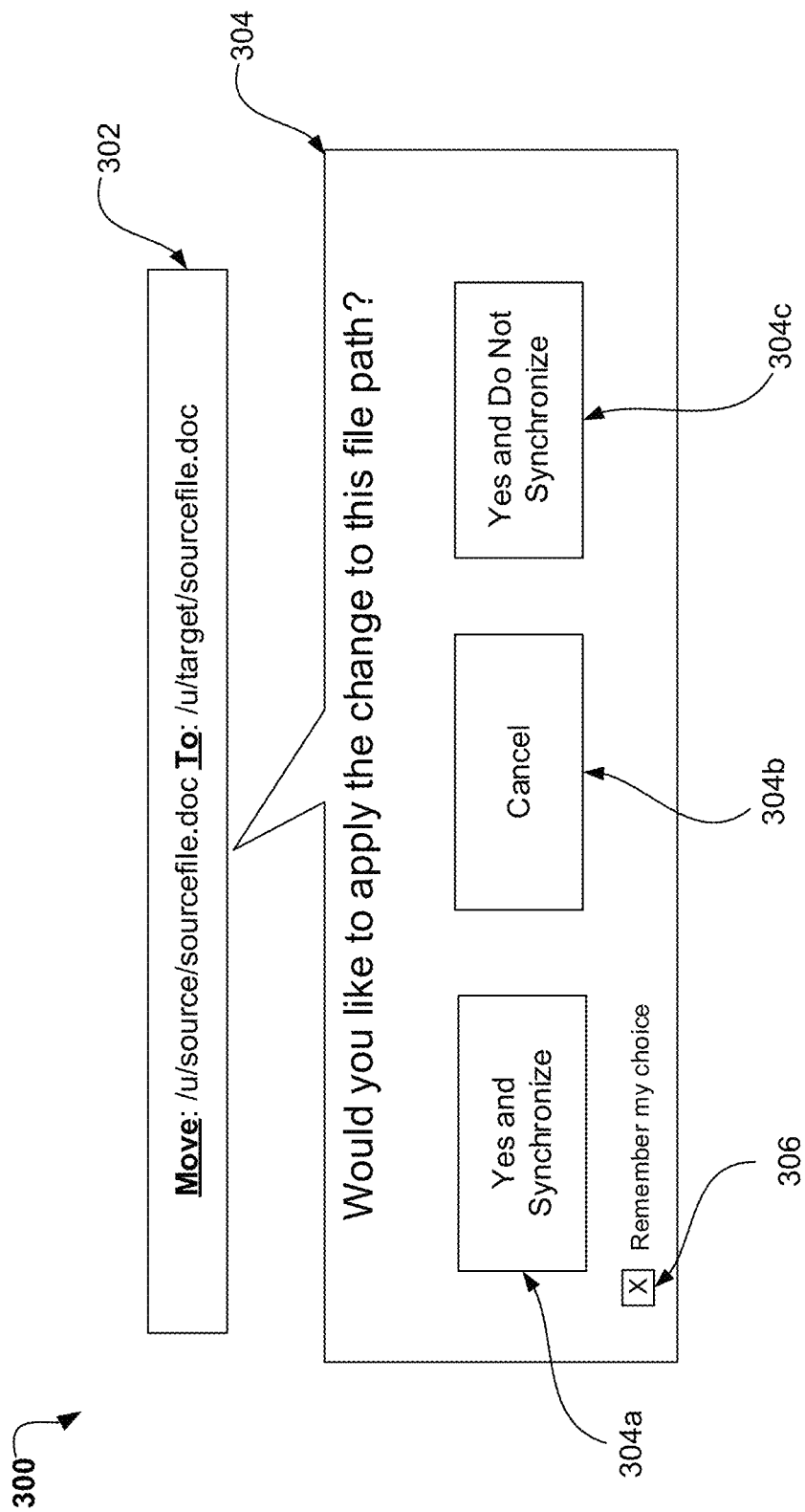
FIG. 3 is an example of a dialogue box for synchronizing file paths associated with computer files according to one embodiment.

Referring now to FIG. 3, an example 300 of a dialogue box 304 in accordance with one embodiment of the present invention is depicted. As previously described in FIG. 2, the file path management program 108A, 108B (FIG. 1) may detect file path changes such as renaming, moving, and deleting computer files. As such, the file path management program 108A, 108B (FIG. 1) may present users with a dialogue box 304 to apply or not to apply the file path changes to the computer files, and to synchronize or not to synchronize the referenced file paths with the target file paths based on the file path changes. For example, as depicted in 302, the file path management program 108A, 108B (FIG. 1) may detect moving a computer file, such as "sourcefile.doc", from folder "source" to folder "target". As such, the file path management program 108A, 108B (FIG. 1) may present a user with a dialogue box 304 to select applying the file path modification and synchronizing the referenced file path, /u/source/sourcefile.doc, with the target file path, /u/target/sourcefile.doc, in 304a. Also, the file path management program 108A, 108B (FIG. 1) may enable a use to cancel the file path modification in 304b, or apply the file path modification and not synchronize the referenced file path with the target file path in 304c. Furthermore, the file path management program 108A, 108B (FIG. 1) may automatically synchronize or not synchronize additional file paths based on the user selecting the "remember my choice" box 306.

Figure 4:
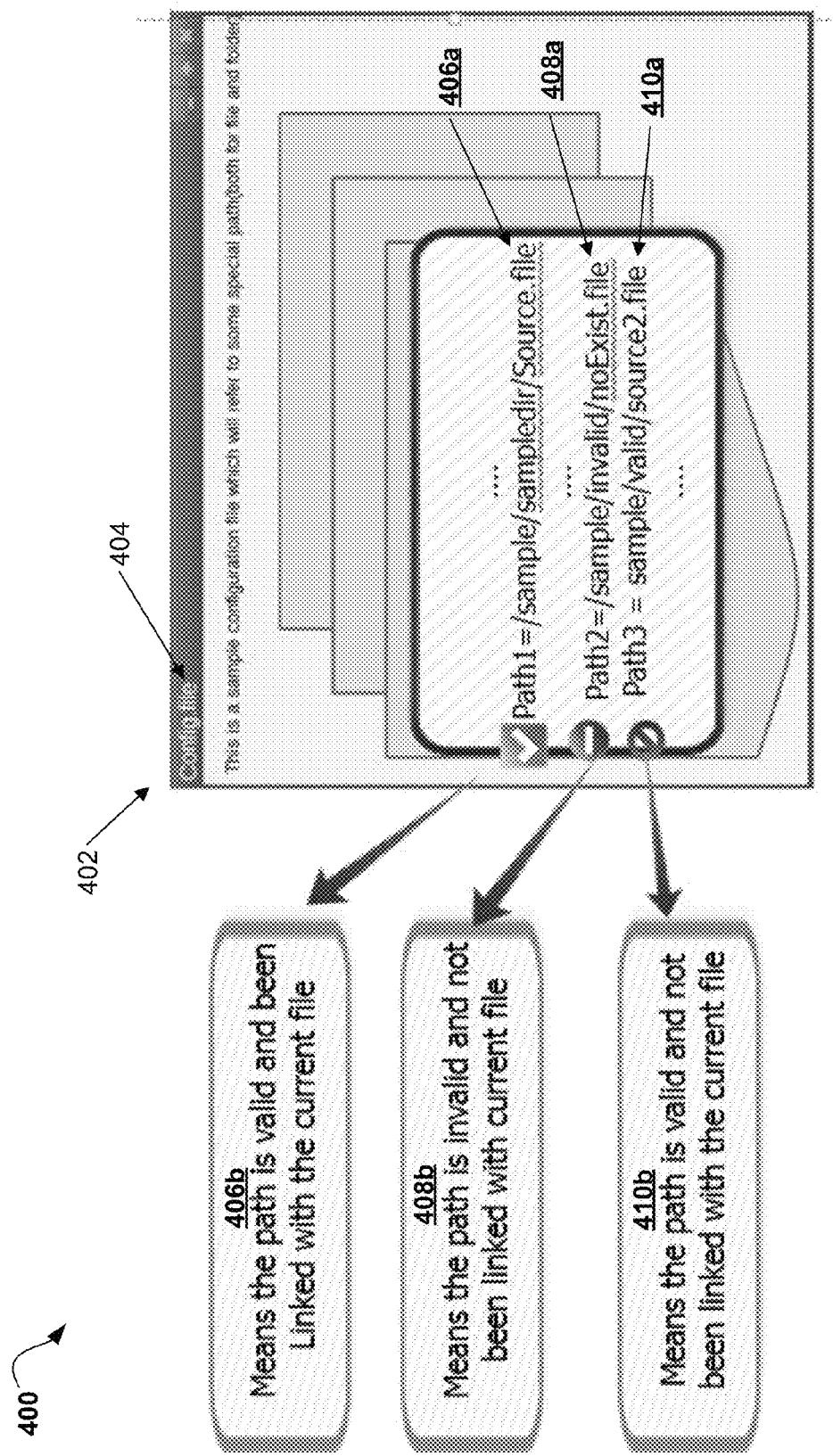
FIG. 4 is an example of file association data associated with a computer file according to one embodiment.

Referring now to FIG. 4, an example 400 of file association data 402 associated with a computer file 404 in accordance with one embodiment is depicted. As previously described, the referenced file paths and the target file paths associated with computer files may be synchronized. As such, the file path management program 108A, 108B (FIG. 1) may identify the referenced file paths and the target file paths 406a, 408a, 410a, and display the status of the referenced file paths and the target file paths 406a, 408a, 410a associated with a computer file 404 in the file association data 402. Specifically, the file path management program 108A, 108B (FIG. 1) may display the file status of the referenced file paths and the target file paths using status indicators 406b, 408b, 410b to indicate whether the referenced file paths and the target file paths 406a, 408a, 410a associated with the computer file 404 are valid and synchronized with the computer file 404. For example, the file path management program 108A, 108B (FIG. 1) may identify the referenced file paths and/or the target file paths 406a, 408a, 410a, that are associated with the computer file 404. Additionally, the file path management program 108A, 108B (FIG. 1) may indicate that the referenced file path or target file path 406a is valid and synchronized with the computer file 404 based on the file status indicator 406b, that the referenced file path or target file path 408a is not valid and not synchronized with the computer file 404 based on the file status indicator 408b, and that the referenced file path or target file path 410a is valid but not synchronized with the computer file 404 based on the file status indicator 410b.

Figure 5:
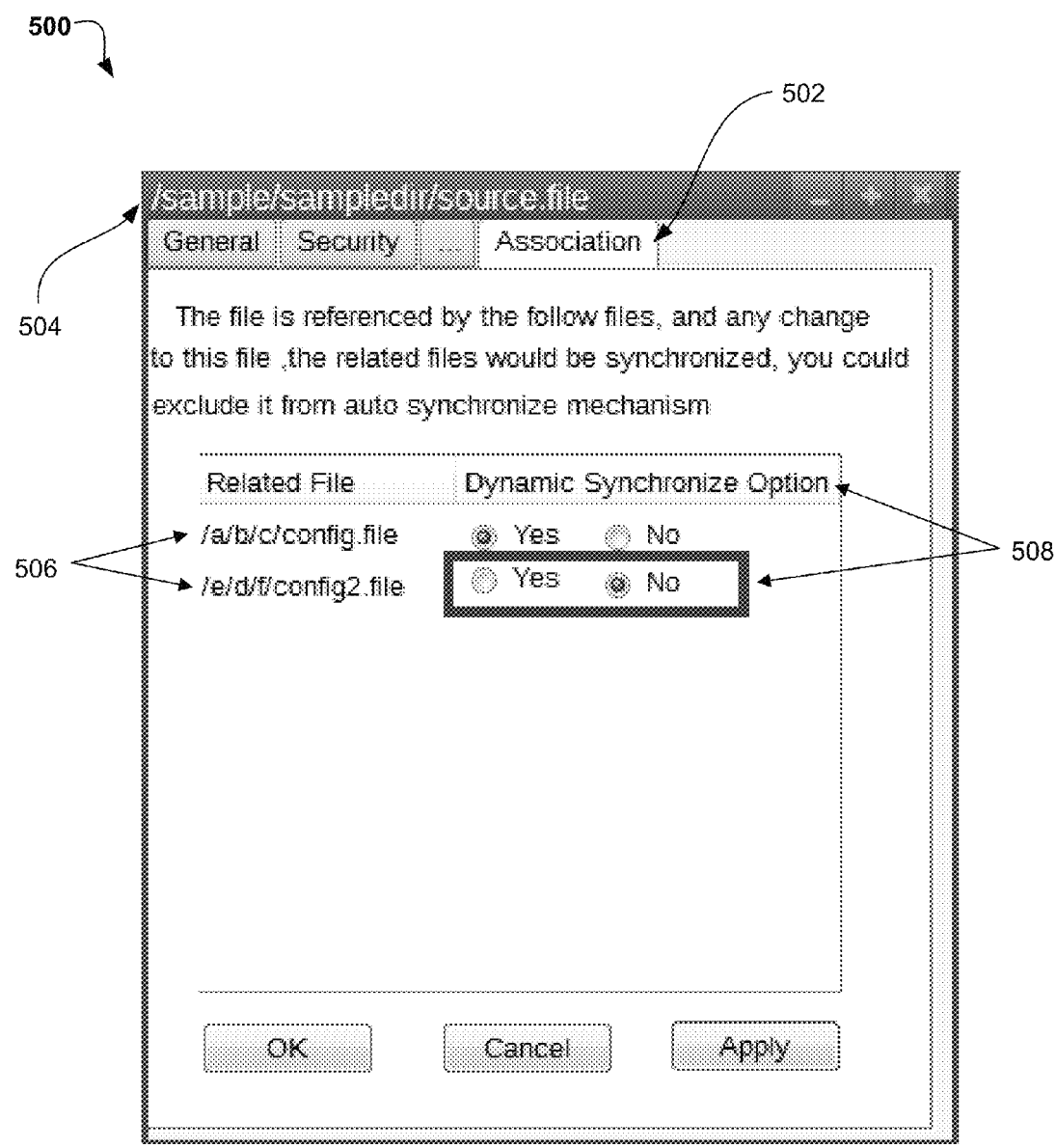
FIG. 5 is an example of a file properties window associated with a computer file path according to one embodiment.

Referring now to FIG. 5, an example of a file properties window 500 associated with a computer file path 504 in accordance with one embodiment is depicted. As previously described in FIG. 2, the referenced file paths of computer files may be synchronized with the target file paths of the computer files. Additionally, the file path management program 108A, 108B (FIG. 1) may include an association tab 502 in a file properties window 500 associated with the referenced file paths and the target file paths 504. Specifically, based on a user action to open a file properties window 500 associated with a referenced file path and/or a target file path 504, the file path management program 108A, 108B (FIG. 1) may display the associated referenced file paths and target file paths 506 in the association tab 502 of the file properties window 500 and further enable users to synchronize or not to synchronize the referenced file paths and target file paths 506. For example, a user action may include right-clicking on a referenced file path 504, such as /sample/sampledir/source.file, to open the file properties window 500 associated with the referenced file path 504. Then, the file path management program 108A, 108B (FIG. 1) may include the association tab 502 in the file properties window 500 and display the target file paths 506, such as a/b/c/config.file and e/d/f/config2.file, that are associated with the referenced file path 504. Furthermore, the file path management program 108A, 108B (FIG. 1) may enable users to synchronize the target file paths 506 with the referenced file path 504, or not to synchronize the target file paths 506 with the referenced file path 504, using the dynamic synchronize option 508.

Figure 6:
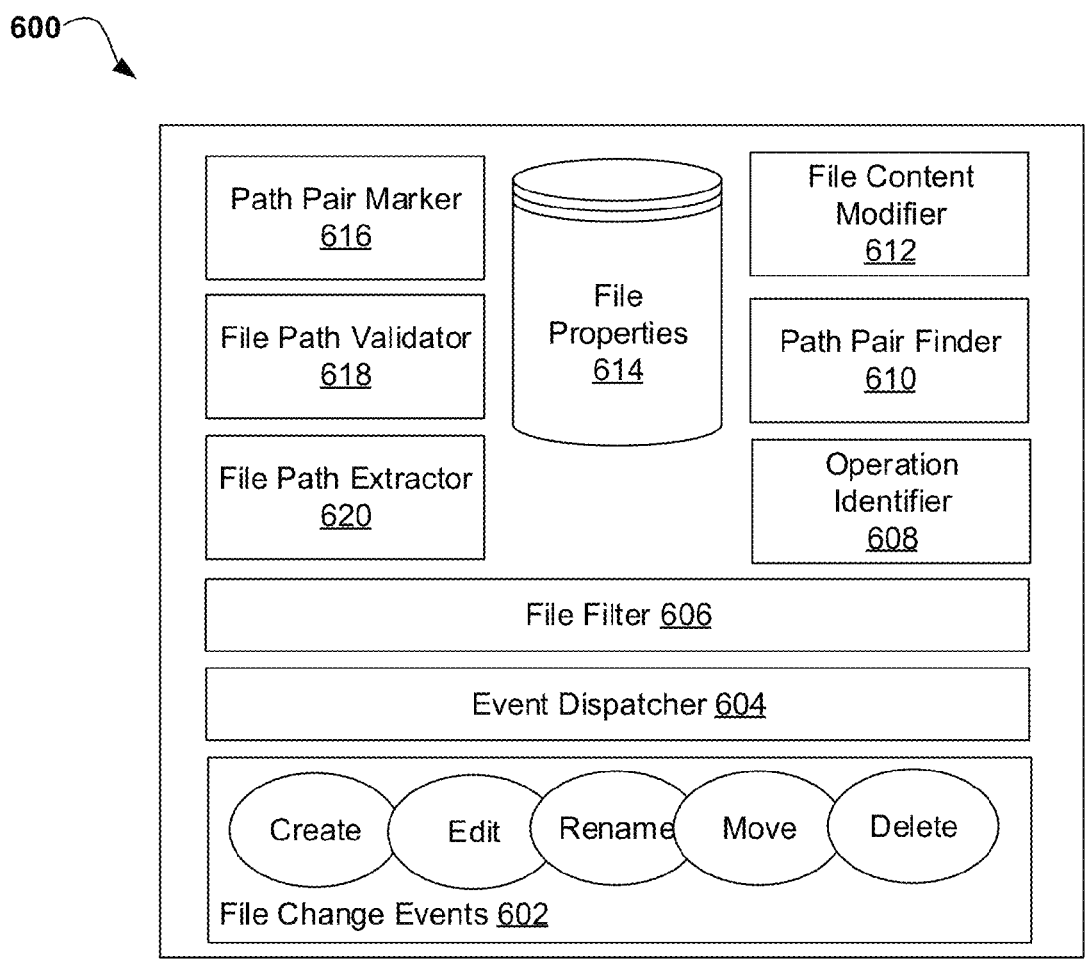
FIG. 6 is a block diagram illustrative of one embodiment of a program for synchronizing file paths associated with computer files based on file path modifications according to one embodiment.

Referring now to FIG. 6, a block diagram 600 of the system architecture of a program for synchronizing file paths associated with computer files is depicted. As previously described in FIG. 2, file change events 602 may be applied to a computer file, such as renaming, moving, and deleting the computer file. Therefore, an event dispatcher 604 may detect at least one file change event 602 to a computer file. Then, a file filter 606 may identify the type of file change event 602 that occurs, more specifically, whether a computer file is created, edited, renamed, moved, and/or deleted. Next, an operation identifier 608 may identify at least one computer file path that is generated based on the identified file change event 602. Furthermore, a path pair finder 610 may identify and synchronize the computer file paths associated with the computer file. Then, based on the synchronization by the path pair finder 610, a file content modifier 612 may modify the computer file path information associated with the computer file. Next, an association tab may be generated in the file properties 614 of the computer file, whereby users may be further enabled to synchronize or not to synchronize the computer file paths. Furthermore, a path pair marker 616 may validate the file path information based on the synchronization of the computer files. Then, a file path validator 618 may validate the computer file path information. Next, a file path extractor 620 may extract and display the validated computer file path information.

Figure 7:
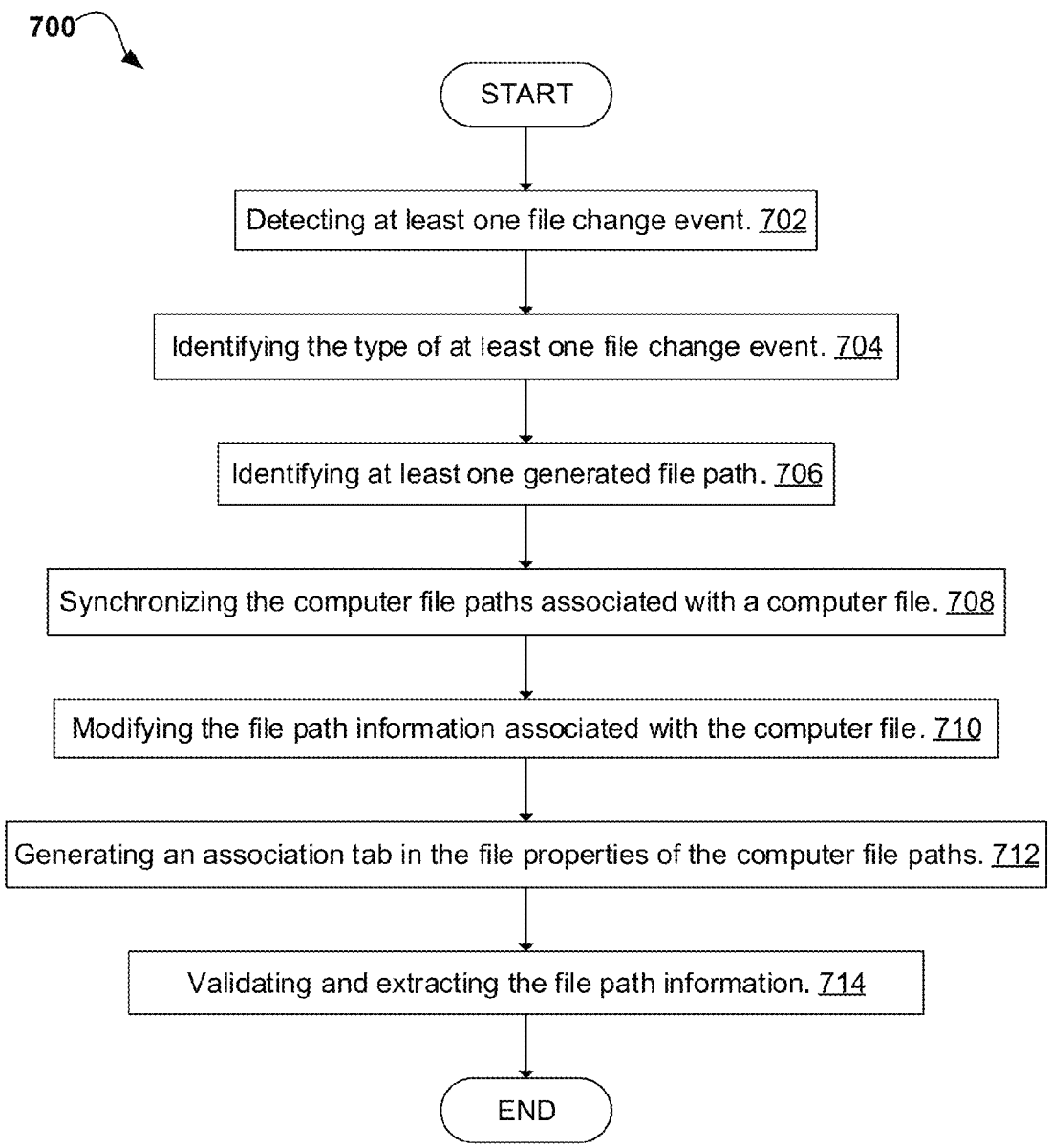
FIG. 7 is an operational flowchart illustrating the steps carried out by a program for synchronizing file paths associated with computer files based on file path modifications according to one embodiment.

Referring now to FIG. 7, an operational flowchart 700 illustrating the steps carried out by a program for synchronizing file paths associated with computer files is depicted. At 702, the file path management program 108A, 108B (FIG. 1) may detect at least one file change event 602 (FIG. 6). As previously described in FIG. 6, a file change event 602 (FIG. 6) may be applied to a computer file, and the file change event 602 (FIG. 6) may be detected by an event dispatcher 604 (FIG. 6). For example, and as previously described in FIG. 2, the file path management program 108A, 108B (FIG. 1) may use the event dispatcher 604 (FIG. 6) to detect that a computer file such as "config.ini" may be renamed 202b (FIG. 2), moved 204b (FIG. 2), and/or deleted 206b (FIG. 2).

Then, at 704, the file path management program 108A, 108B (FIG. 1) may identify the type of file change event 602 (FIG. 6). As previously described at step 702, the file path management program 108A, 108B (FIG. 1) may detect at least one file change event 602 (FIG. 6) using the event dispatcher 604 (FIG. 6). Additionally, the file path management program 108A, 108B (FIG. 1) may identify the type of file change event 602 (FIG. 6) using the file filter 606 (FIG. 6). Therefore, according to one implementation, the file path management program 108A, 108B (FIG. 1) may detect that at least one file change event 602 (FIG. 6) may be applied to a computer file, such as creating, editing, renaming, moving, and deleting the computer file. Then, using the file filter 606 (FIG. 6), the file path management program 108A, 108B (FIG. 1) may determine that the at least one file change event 602 (FIG. 6) that occurs is the moving of a computer file from one folder to a different folder, as previously described in 204a, 204b (FIG. 2).

Next, at 706, the file path management program 108A, 108B (FIG. 1) may identify at least one generated file path. Specifically, using the operation identifier 608 (FIG. 6), the file path management program 108A, 108B (FIG. 1) may identify at least one computer file path that is generated based on the detected and identified file change event 602 (FIG. 6). Therefore, as previously described in FIG. 2, the file path management program 108A, 108B (FIG. 1) may detect and identify that a computer file, such as "config.ini", with a referenced file path /var/etc/config.ini, is moved from folder "etc" to folder "B". Thus, for example, the file path management program 108A, 108B (FIG. 1) may identify the generated target file path such as /var/B/config.ini, based on the move to folder "B".

Then, at 708, the file path management program 108A, 108B (FIG. 1) may synchronize the computer file paths associated with the computer file. Specifically, using the path pair finder 610 (FIG. 6), the file path management program 108A, 108B (FIG. 1) may identify and synchronize the referenced file paths and target file paths associated with the computer file. For example, as previously described in step 706, a computer file, such as "config.ini", may have a referenced file path, such as /var/etc/config.ini, that is used by other applications and programs to refer to the computer file. Furthermore, the computer file may be moved from folder "etc" to folder "B". As such, based on the move from folder "etc" to folder "B", the referenced file path may be an invalid location for the computer file. However, using the path pair finder 610 (FIG. 6), the file path management program 108A, 108B (FIG. 1) may identify the referenced file path, /var/etc/config.ini, and the generated and identified target file path, /var/B/config.ini, as computer file paths associated with the computer file "config.ini", and therefore, synchronize the referenced file path with the generated target file path associated with the computer file.

Alternatively, the file path management program 108A, 108B (FIG. 1) may synchronize the computer file paths associated with the computer file in response to a user action. For example, the file path management program 108A, 108B (FIG. 1) may detect a file change event 602 (FIG. 6), such as moving a computer file from one folder to a different folder. Therefore, as previously described in FIG. 3, the file path management program 108A, 108B (FIG. 1) may present a user with a dialogue box 304 (FIG. 3) to select applying the file path change 602 (FIG. 6) and synchronizing the referenced file path with the target file paths in 304a (FIG. 3), canceling the file path change 602 (FIG. 6) in 304b (FIG. 3), or applying the file path change 602 (FIG. 6) and not synchronizing the referenced file path with the target file paths in 304c (FIG. 3). Based on the user selection, the file path management program 108A, 108B (FIG. 1) may synchronize or not synchronize the referenced file paths and target file paths.

Next, at 710 the file path management program 108A, 108B (FIG. 1) may modify the file path information associated with the computer file. As previously described in FIG. 6, based on the synchronization by the path pair finder 610 (FIG. 6), a file content modifier 612 (FIG. 6) may modify/update the computer file path information associated with the computer file. Specifically, the file path management program 108A, 108B (FIG. 1) may identify the status of the synchronized, or not synchronized, referenced file paths and target file paths associated with a computer file. For example, as previously described in FIG. 4, the file path management program 108A, 108B (FIG. 1) may identify the referenced file paths and the target file paths 406a, 408a, 410a (FIG. 4) associated with a computer file 404 (FIG. 4). Furthermore, the file path management program 108A, 108B (FIG. 1) may modify/update the file path information 402 (FIG. 4) of a computer file 404 (FIG. 4) to reflect the synchronization status of the referenced file paths and target file paths associated with the computer file 404 (FIG. 4). For example, the file path management program 108A, 108B (FIG. 1) may display the file status of the referenced file paths and the target file paths using status indicators 406b, 408b, 410b (FIG. 4) to indicate whether the referenced file paths and the target file paths 406a, 408a, 410a (FIG. 4) associated with the computer file 404 (FIG. 4) are valid and synchronized with the computer file 404 (FIG. 4), invalid and not synchronized with the computer file 404 (FIG. 4), and valid but not synchronized with the computer file 404 (FIG. 4).

Then, at 712 the file path management program 108A, 108B (FIG. 1) may generate an association tab 502 (FIG. 5) in the file properties of the computer file paths. As previously described in FIG. 5, the file path management program 108A, 108B (FIG. 1) may include an association tab 502 (FIG. 5) in a file properties window 500 (FIG. 5) of a computer file path associated with a computer file to display the association data for the referenced file paths and the target file paths 504 (FIG. 5). For example, a user may right-click on a referenced file path 504 (FIG. 5), such as /sample/sampledir/source.file, to open the file properties window 500 (FIG. 5) associated with the referenced file path 504 (FIG. 5) of a computer file. Then, the file path management program 108A, 108B (FIG. 1) may include the association tab 502 (FIG. 5) in the file properties window 500 (FIG. 5) and display the target file paths 506 (FIG. 5), such as a/b/c/config.file and e/d/f/config2.file, that are synchronized with the referenced file path 504 (FIG. 5) and associated with the computer file. Also, as previously described in FIG. 5, the file path management program 108A, 108B (FIG. 1) may further enable users to synchronize the target file paths 506 (FIG. 5) with the referenced file path 504 (FIG. 5), or not to synchronize the target file paths 506 (FIG. 5) with the referenced file path 504 (FIG. 5), using the dynamic synchronize option 508 (FIG. 5).

Next, at 714, the file path management program 108A, 108B (FIG. 1) may validate the referenced file path information and the target file path information. Specifically, the file path management program 108A, 108B (FIG. 1) may use the path pair marker 616 (FIG. 6) to validate that a valid synchronized path exists between the referenced file paths and the target file paths. Furthermore, the file path management program 108A, 108B (FIG. 1) may use the file path validator 618 (FIG. 6) to validate that the referenced file paths and the target file paths are valid. As such, the file path management program 108A, 108B (FIG. 1) may use the file path extractor 620 (FIG. 6) to extract the referenced file path information for use by other applications and programs.

For example, as previously described in step 712, the file path management program 108A, 108B (FIG. 1) may enable users to synchronize the target file path 506 (FIG. 5), such as a/b/c/config.file, with the referenced file path 504 (FIG. 5), such as /sample/sampledir/source.file, using the dynamic synchronize option 508 (FIG. 5). Therefore, based on the user selection, the file path management program 108A, 108B (FIG. 1) may use the path pair marker 616 (FIG. 6) to validate that a valid synchronized path exists between the referenced file path 504 (FIG. 5) and the target file path 506 (FIG. 5). Furthermore, the file path management program 108A, 108B (FIG. 1) may use the file path validator 618 (FIG. 6) to validate that the referenced file path 504 (FIG. 5) and the target file path 506 (FIG. 5) are valid file paths. As such, based on the validations by the path pair marker 616 (FIG. 6) and the file path validator 618 (FIG. 6), the file path management program 108A, 108B (FIG. 1) may use the file path extractor 620 (FIG. 6) to extract the referenced file path information for use by applications and programs that use the file path information to refer to the computer file.

It may be appreciated that FIGS. 2-7 provide only an illustration of one implementation and does not imply any limitations with regard to how different embodiments may be implemented. Many modifications to the depicted environments may be made based on design and implementation requirements. For example, the file path management program 108A, 108B (FIG. 1) may identify a plurality of target file paths based on a plurality of detected file path changes 602 (FIG. 6). For example, as previously described in FIG. 2, a computer file, such as "config.ini", may be referenced by applications and programs using the referenced file path, /var/etc/config.ini. Furthermore, the file path management program 108A, 108B (FIG. 1) may detect that the computer file may be renamed to "Myconfig.ini", as in file system 202a (FIG. 2). As such, the referenced file path may be change to the target file path, such as /var/etc/Myconfig.ini, and the target file path may be referenced by applications and programs. Additionally, the file path management program 108A, 108B (FIG. 1) may detect that the computer file "Myconfig.ini" is then moved to folder B. Therefore, the target file may be changed to /var/B/Myconfig.ini. As such, the file path management program 108A, 108B (FIG. 1) may synchronize the file paths /var/etc/config.ini, /var/etc/Myconfig.ini, and /var/B/Myconfig.ini.

Figure 8:
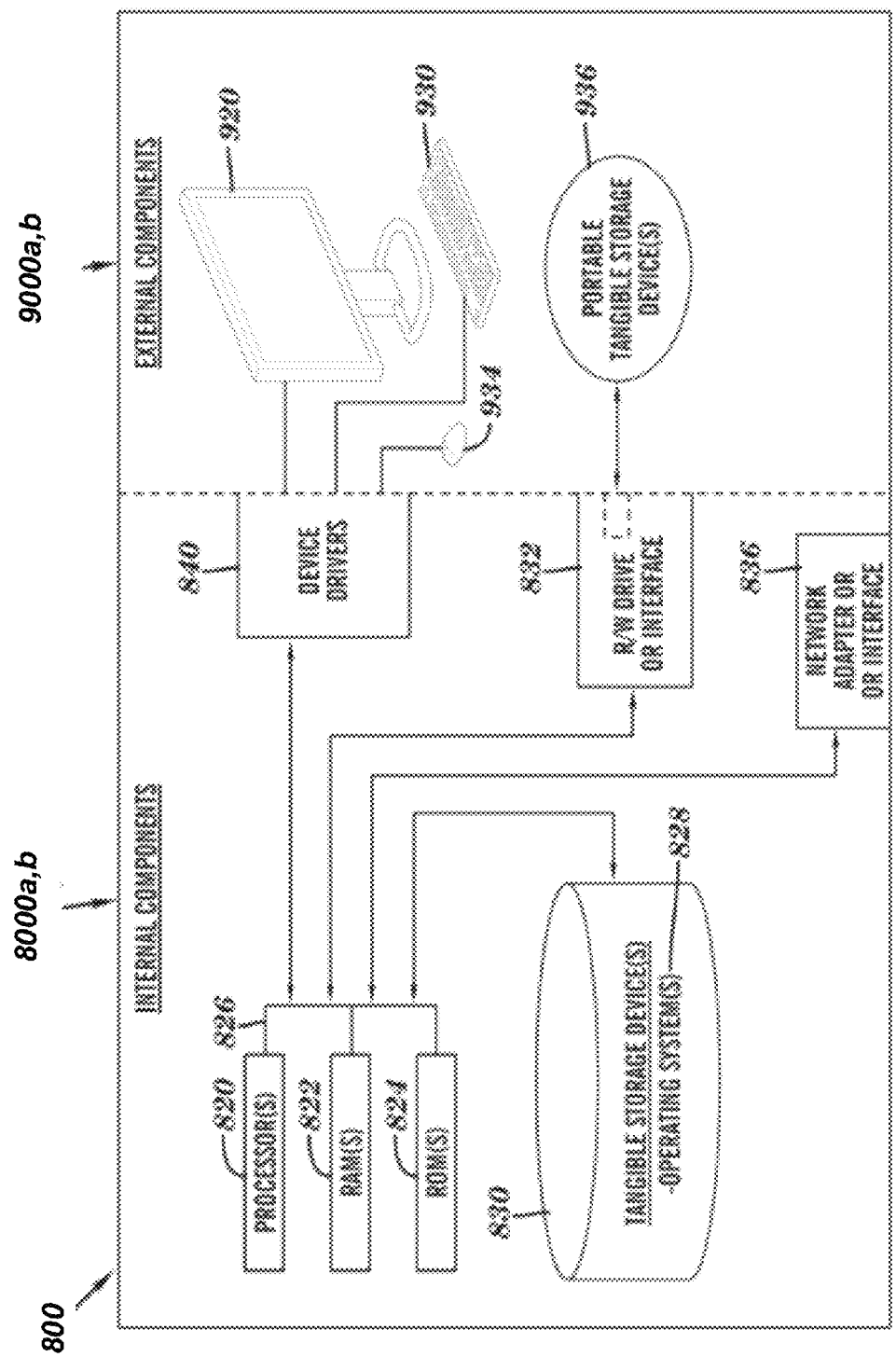
FIG. 8 is a block diagram of the system architecture of a program for synchronizing file paths associated with computer files based on file path modifications according to one embodiment.

FIG. 8 is a block diagram 800 of internal and external components of computers depicted in FIG. 1 in accordance with an illustrative embodiment of the present invention. It should be appreciated that FIG. 8 provides only an illustration of one implementation and does not imply any limitations with regard to the environments in which different embodiments may be implemented. Many modifications to the depicted environments may be made based on design and implementation requirements.

Data processing system 8000, 9000 is representative of any electronic device capable of executing machine-readable program instructions. Data processing system 8000, 9000 may be representative of a smart phone, a computer system, PDA, or other electronic devices. Examples of computing systems, environments, and/or configurations that may represented by data processing system 8000, 9000 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 8000 a, b and external components 9000 a, b illustrated in FIG. 8. Each of the sets of internal components 8000 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, the software program 114 (FIG. 1), the file path management program 108A (FIG. 1) in client computer 102 (FIG. 1), and the file path management program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 8, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 8000a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as a file path management program 108A and 108B (FIG. 1), can be stored on one or more of the respective portable computer-readable tangible storage devices 936, read via the respective R/W drive or interface 832 and loaded into the respective hard drive 830.

Each set of internal components 8000a, b also includes network adapters or interfaces 836 such as a TCP/IP adapter cards, wireless Wi-Fi interface cards, or 3G or 4G wireless interface cards or other wired or wireless communication links. The file path management program 108A (FIG. 1) and software program 114 (FIG. 1) in client computer 102 (FIG. 1), and the file path management program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the file path management program 108A (FIG. 1) and software program 114 (FIG. 1) in client computer 102 (FIG. 1) and the file path management program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 9000a, b can include a computer display monitor 920, a keyboard 930, and a computer mouse 934. External components 9000a, b can also include touch screens, virtual keyboards, touch pads, pointing devices, and other human interface devices. Each of the sets of internal components 8000a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
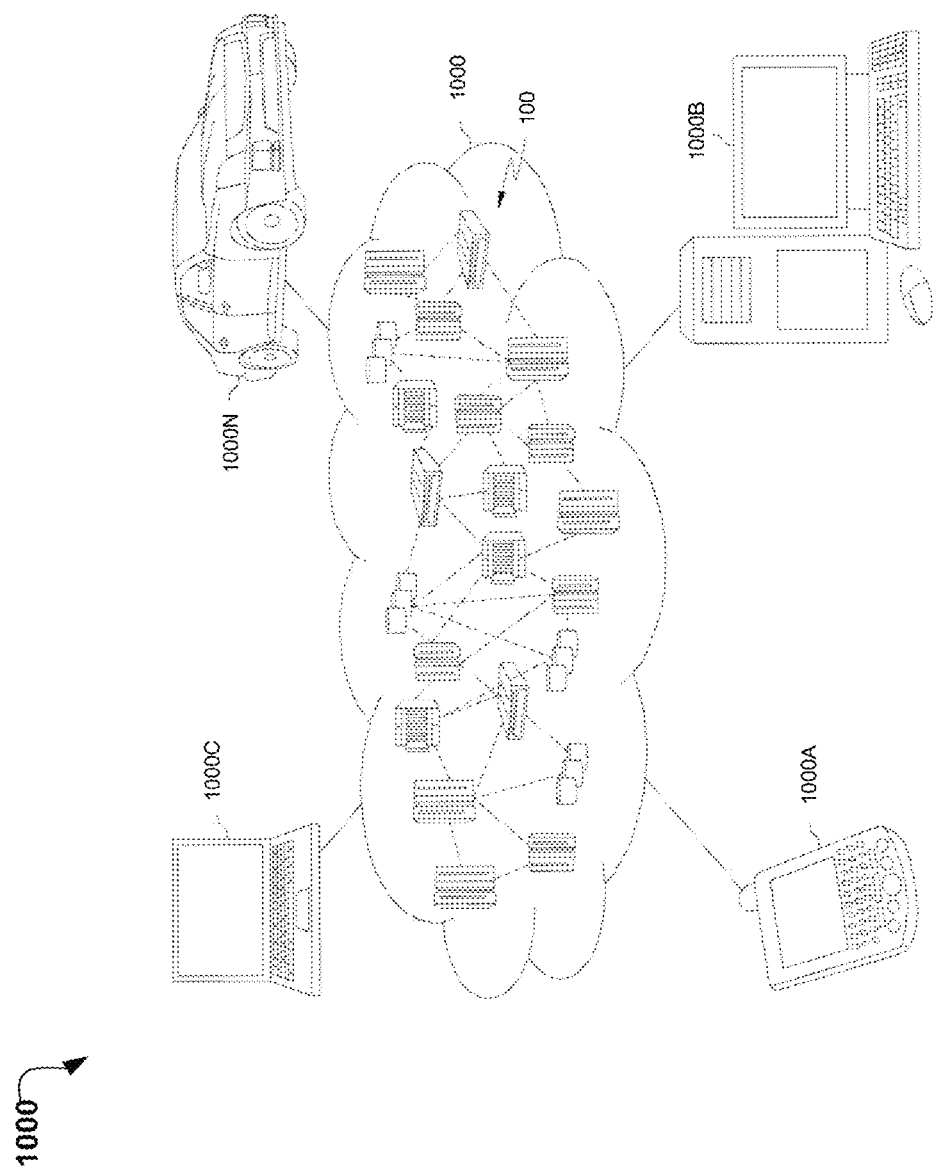
FIG. 9 is a block diagram of an illustrative cloud computing environment including the computer system depicted in FIG. 1, in accordance with an embodiment of the present disclosure.

Referring now to FIG. 9, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 9 are intended to be illustrative only and that computing nodes 100 and cloud computing environment 1000 can communicate with any type of computerized device over any type of network and/or network addressable connection (e.g., using a web browser).

Figure 10:
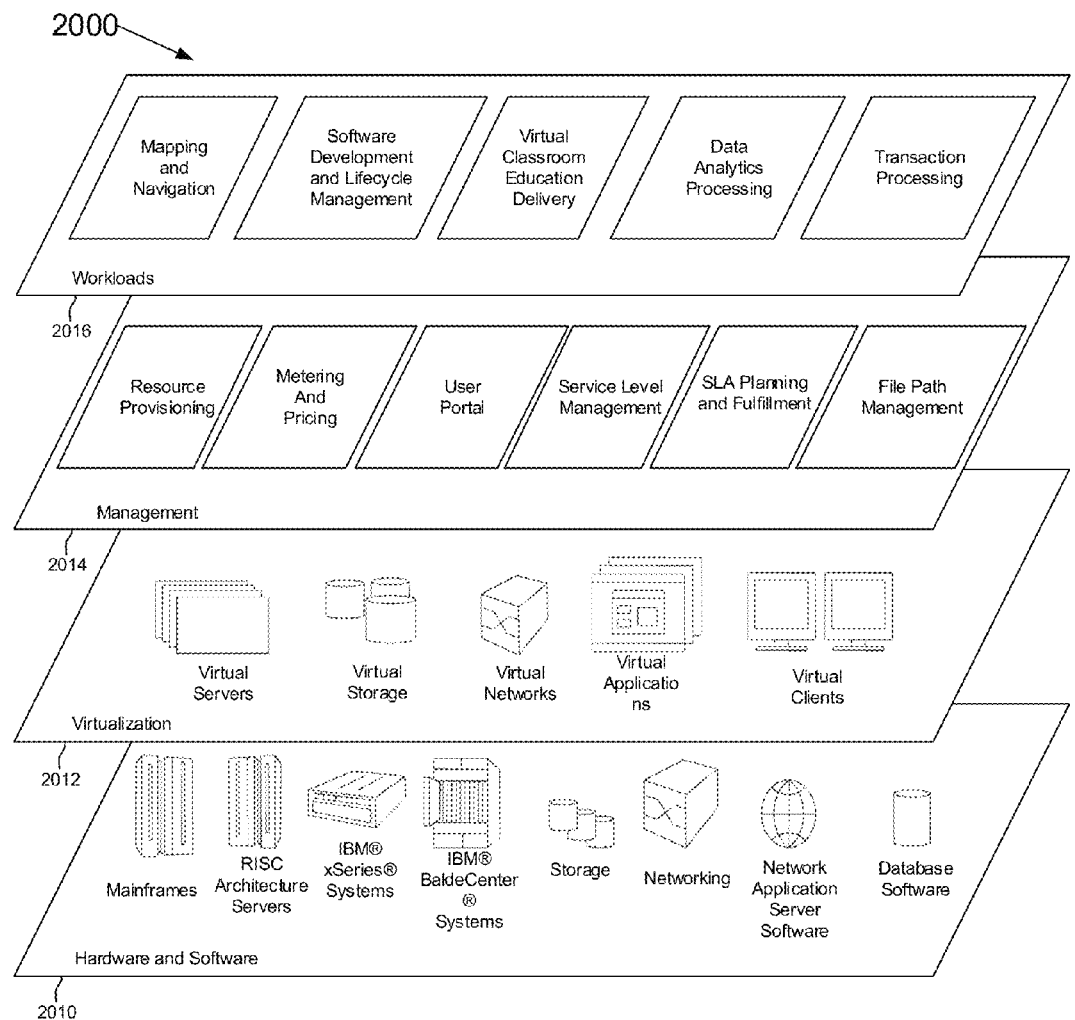
FIG. 10 is a block diagram of functional layers of the illustrative cloud computing environment of FIG. 9, in accordance with an embodiment of the present disclosure.

Referring now to FIG. 10, a set of functional abstraction layers 2000 provided by cloud computing environment 1000 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 2010 includes hardware and software components. Examples of hardware components include: mainframes; RISC (Reduced Instruction Set Computer) architecture based servers; storage devices; networks and networking components. In some embodiments, software components include network application server software.

Virtualization layer 2012 provides an abstraction layer from which the following examples of virtual entities may be provided: virtual servers; virtual storage; virtual networks, including virtual private networks; virtual applications and operating systems; and virtual clients.

In one example, management layer 2014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A File Path Management program may provide cloud accessible testing environments for synchronizing file paths associated with computer files based on file path modifications.

Workloads layer 2016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for synchronizing file paths associated with computer files based on at least one file path modification, comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

detecting the at least one file path modification to a referenced file path associated with a computer file, wherein the at least one file path modification comprises at least one of creating the computer file, editing the computer file, renaming the computer file, moving the computer file, and deleting the computer file;

identifying a type of the at least one file path modification to the referenced file path associated with the computer file, wherein identifying the type of the at least one file path modification comprises determining at least one of whether the computer file is created, whether the computer file is edited, whether the computer file is renamed, whether the computer file is moved, and whether the computer file is deleted;

identifying at least one generated file path based on the identified type of the at least one file path modification;

presenting a user with a dialogue box, wherein the dialogue box enables the user to apply or not to apply the at least one file modification and to synchronize or not to synchronize the referenced file path associated with the computer file to the at least one generated file path associated with the computer file;

in response to receiving a user action, synchronizing the referenced file path associated with the computer file to the at least one generated file path associated with the computer file, wherein receiving the user action comprises receiving a selection on the dialogue box to synchronize the referenced file path associated with the computer file to the at least one generated file path associated with the computer file;

modifying a plurality of file path information associated with the computer file based on the synchronized referenced file path and the at least one generated file path associated with the computer file;

generating an association tab on a file properties window, wherein the association tab comprises a plurality of association information associated with the referenced file path and the at least one generated file path, and wherein the plurality of association information comprises at least one file path, at least one synchronization status indicator, and at least one dynamic synchronization option to enable users to synchronize or not to synchronize the at least one file path; and validating and extracting the file path information associated with the computer file for use by at least one application.

* * * * *